(12) United States Patent
Hiramoto et al.

(10) Patent No.: US 10,140,558 B2
(45) Date of Patent: Nov. 27, 2018

(54) PRINT CONTROL SYSTEM, PRINT CONTROL APPARATUS, AND PROGRAM

(71) Applicant: KONICA MINOLTA, INC., Chiyoda-ku, Tokyo (JP)

(72) Inventors: Hirotsugu Hiramoto, Kobe (JP); Yoshiyuki Harada, Musashino (JP)

(73) Assignee: KONICA MINOLTA, INC., Tokyo (JP)

(*) Notice: Subject to any disclaimer, the term of this patent is extended or adjusted under 35 U.S.C. 154(b) by 84 days.

(21) Appl. No.: 15/338,094

(22) Filed: Oct. 28, 2016

(65) Prior Publication Data
US 2017/0147912 A1 May 25, 2017

(30) Foreign Application Priority Data
Nov. 19, 2015 (JP) .................... 2015-226376

(51) Int. Cl.
G06K 15/02 (2006.01)
G06F 3/12 (2006.01)
H04N 1/00 (2006.01)

(52) U.S. Cl.
CPC ......... *G06K 15/1822* (2013.01); *G06F 3/122* (2013.01); *G06F 3/1246* (2013.01);
(Continued)

(58) Field of Classification Search
CPC ............ G06K 15/1822; G06K 15/1813; G06F 3/1247; G06F 3/1248; G06F 3/122; G06F 3/1246; H04N 1/00204; H04N 2201/0094
See application file for complete search history.

(56) References Cited

U.S. PATENT DOCUMENTS

| 8,780,127 B2 * | 7/2014 | Takeishi | G06F 3/1243 345/522 |
| 8,854,638 B2 * | 10/2014 | Inoue | G06F 3/1211 358/1.13 |

(Continued)

FOREIGN PATENT DOCUMENTS

| JP | 2012234454 A | 11/2012 |
| JP | 2014241118 A | 12/2014 |

OTHER PUBLICATIONS

Japanese Office Action dated Dec. 26, 2017 issued in counterpart Japanese Application No. 2015-226376.

(Continued)

*Primary Examiner* — Kent Yip
(74) *Attorney, Agent, or Firm* — Holtz, Holtz & Volek PC

(57) ABSTRACT

A non-transitory recording medium storing a computer readable program causes a computer to execute: a) analyzing unconverted first page description language data to determine whether a repetitive pattern image portion is included in the first page description language data; b) separating the repetitive pattern image portion from the first page description language data when it is determined that the repetitive pattern image portion is included in the first page description language data; c) generating first partial data in a second page description language; d) generating second partial data in the second page description language based on a portion other than the repetitive pattern image portion of the first page description language data; and e) generating converted data that relates to the first page description language data and is second page description language data based on the first partial data and the second partial data.

17 Claims, 18 Drawing Sheets

(52) U.S. Cl.
CPC .......... *G06F 3/1247* (2013.01); *G06F 3/1248* (2013.01); *G06F 3/1285* (2013.01); *G06K 15/1813* (2013.01); *H04N 1/00204* (2013.01); *H04N 2201/0094* (2013.01)

(56) References Cited

U.S. PATENT DOCUMENTS

| | | | | |
|---|---|---|---|---|
| 2005/0162676 A1* | 7/2005 | Aoki | ................. | G06F 3/1215 358/1.13 |
| 2010/0328340 A1* | 12/2010 | Yanagita | ................. | H04N 1/46 345/590 |
| 2011/0141508 A1* | 6/2011 | Inoue | ................. | G06F 3/1211 358/1.13 |
| 2011/0157637 A1* | 6/2011 | Kimura | ............. | G06K 15/1849 358/1.15 |
| 2012/0243032 A1* | 9/2012 | Hayakawa | ......... | G06K 15/1859 358/1.15 |
| 2012/0287451 A1 | 11/2012 | Takeishi | | |
| 2015/0262046 A1* | 9/2015 | Hayakawa | ............... | G06F 3/12 358/3.24 |

OTHER PUBLICATIONS

"PostScript Language Reference", Third Edition, Adobe Systems Incorporated, Feb. 1999, pp. 248-259, ISBN: 0-201-37992-8.

\* cited by examiner

FIG. 7

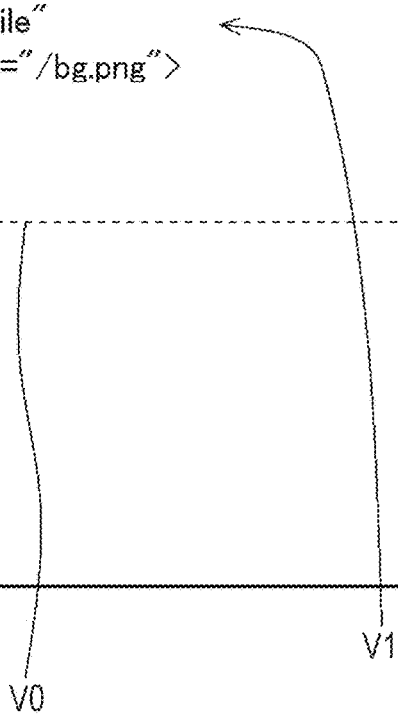

```
<?xml version="1.0" encoding="utf-8"?>
<FixedPage
    Width="816"
    Height="1056"
    xmlns="http://schemas.microsoft.com/xps/2005/06"
    xml:lang="und">
    <Canvas>
...
        <Path Data="F1 M 0,0 L 816,0 816, 1056 0, 1056 z">
            <Path.Fill>
                <ImageBrush
                    Viewport="0,0,552.96,92.16"
                    ViewportUnits="Absolute"
                    Viewbox="0,0,3456,576"
                    ViewboxUnits="Absolute"
                    TileMode="Tile"
                    ImageSource="/bg.png">
                </ImageBrush>
        </Path.Fill>
        </Path>
...
    </Canvas>
...
</FixedPage>
...
```

```
...
ubyte  ePortraitOrientation  Orientation
ubyte  eLetterPaper  MediaSize
ubyte  eAutoSelect  MediaSource
BeginPage // Page #1, Session #1, File Page 1                    ← BL0, D1 ubyte_array "CP0"  StreamName
BeginStream uint32  110034  StreamDataLength
ReadStream dataLength  110034
hex_raw* [
29 20 48 50 2D 50 43 4C 20 58 4C 3B 32 3B 31 3B
0A D5 00 00 80 3F 00 00 80 3F F8 2B 77 C0 00 F8
...
7F 7F 02 7F E1 7F 7F 7F 7F 7F 7F 7F 7F E1 7F 7F
7F 7F 7F 7F 7F 7F 21 7F 7F 02 7F 81 7F 7F 7F 7F
7F B2 ]

EndStream

PushGS

SetPageDefaultCTM

(REPEAT)

...                                                              ⎫ BL21, D21
sint16_xy  100  5860  PageOrigin
SetPageOrigin sint16_box  0  0  4900  6400  BoundingBox  ⎫
ubyte  eInterior  ClipRegion                ⎬ 211
SetClipRectangle                            ⎭
...
ubyte_array  "CP0"  StreamName
ExecStream
...                                                              ⎫ BL22, D21
sint16_xy  3556  5860  PageOrigin
SetPageOrigin sint16_box  0  0  4900  6400  BoundingBox  ⎫
ubyte  eInterior  ClipRegion                ⎬ 211
SetClipRectangle                            ⎭
...
ubyte_array  "CP0"  StreamName
ExecStream ...
EndPage // Page #1, Session #1, File Page 1
...
```

FIG. 14

```
<?xml version="1.0" encoding="utf-8"?>
<FixedPage Width="793.760000" Height="1122.560000" xml:lang="und"
    xmlns="http://schemas.microsoft.com/xps/2005/06">
<Canvas>
    <Canvas RenderTransform="1,0,0,1,16,16">
    <Path Data="F1 M 118.08,89.28 L 575.52,89.28 575.52,380.48 118.08,380.48 z">
        <Path.Fill>
            <ImageBrush TileMode="Tile"                    V2
            ViewboxUnits="Absolute"
            Viewbox="0,0,8,8"
            ViewportUnits="Absolute"
            Viewport="0,0,5.12,5.12"
            ImageSource="/Documents/1/Resources/Images/1.PNG"/>
        </Path.Fill>
    </Path>
    </Canvas>
</Canvas>
    :
    :
</FixedPage>
```

FIG. 15

```
...                                                              ⎯ BL51, D1
ubyte eIndexedPixel ColorMapping
ubyte e1Bit ColorDepth
uint16 8 SourceWidth
uint16 8 SourceHeight
uint16_xy 32 32 DestinationSize
sint16 9787 PatternDefineID
ubyte ePagePattern PatternPersistence BeginRastPattern uint16 0 StartLine
uint16 8 BlockHeight
ubyte eDeltaRowCompression CompressMode
ReadRastPattern dataLengthByte 32
hex_raw* [
02 00 00 3F 02 00 00 9F 02 00 00 CF 02 00 00 E7
02 00 00 F3 02 00 00 F9 02 00 00 FC 02 00 00 7E
]

EndRastPattern
...
```

FIG. 18

```
ubyte ePortraitOrientation Orientation
ubyte eLetterPaper MediaSize
ubyte eAutoSelect MediaSource
// Operator Position: 297
BeginPage // Page #2, Session #1, File Page 2
...
```
— B61
```
ubyte_xy 100 100 Point
/.../ Operator Position: 306
SetCursor
...
ubyte eDirectPixel ColorMapping
ubyte e8Bit ColorDepth
uint16 4900 SourceWidth
uint16 72 SourceHeight
uint16_xy 4900 72 DestinationSize
BeginImage uint16 0 StartLine
uint16 72 BlockHeight
ubyte eDeltaRowCompression CompressMode
ReadImage dataLength 37344
hex_raw* [
54 3B E0 FF FF FF FF FF FF FF FF E0 FF FF FF FF
FF FF FF FF E0 FF FF FF FF FF FF FF FF E0 FF FF
....
17 FF 1F 10 FF 1F 10 FF 17 FF 17 FF 02 FF 1F 0D
FF 02 FF 1F 0D FF 02 FF 1F 6D FF 02 FF 1F 0D FF
02 FF 1F 0D FF 02 FF 1F 0D FF 00 00 00 00 00 00
]

EndImage
...
```

FIG. 19

```
...
ubyte_xy 100 172 Point
SetCursor
...
dataLength 34908
hex_raw* [
54 3B E0 FF FF FF FF FF FF FF FF E0 FF FF FF FF
FF FF FF FF E0 FF FF FF FF FF FF FF FF E0 FF FF
...
17 FF 1F 28 FF 1F 40 FF 17 FF 02 FF 1F 0D FF 02
FF 1F 3D FF 02 FF 00 00 00 00 00 00 ]
...
```
— B62

```
ubyte_xy 100 244 Point
SetCursor
...
dataLength 35822
hex_raw* [
54 3B E0 FF FF FF FF FF FF FF FF E0 FF FF FF FF
FF FF FF FF E0 FF FF FF FF FF FF FF FF E0 FF FF
...
FF 17 FF 17 FF 1F 10 FF 1F 10 FF 17 FF 17 FF 17
FF 02 FF 1F 3D FF 02 FF 00 00 00 00 00 00 ]
...
```
— B63

(REPEAT)

...

```
uint16_xy 100 6364 Point
SetCursor
...
dataLength 25762
hex_raw* [
54 3B E0 FF FF FF FF FF FF FF FF E0 FF FF FF FF
FF FF FF FF E0 FF FF FF FF FF FF FF FF E0 FF FF
...
FF 17 FF 17 FF 1F 28 FF 17 FF 17 FF 00 00 00 00
00 00 ]
...
```

PRINT CONTROL SYSTEM, PRINT
CONTROL APPARATUS, AND PROGRAM

The entire disclosure of Japanese Patent Application No. 2015-226376 filed on Nov. 19, 2015 including description, claims, drawings, and abstract are incorporated herein by reference in its entirety.

BACKGROUND OF THE INVENTION

Field of the Invention

The present invention relates to print control technology, and particularly relates to a print control apparatus which executes a conversion process from a page description language (hereinafter also referred to as PDL) to another page description language (PDL), and technology pertaining thereto.

Description of the Related Art

In a printer driver, a process for converting a PDL to another PDL may be performed.

For example, a conversion process from extensible markup language (XML) paper specification (XPS) to printer command language (PCL) may be performed (see JP 2014-241118 A). When performing such a conversion process, "XPS to PCL filter" (hereinafter also referred to as a standard filter) provided by Microsoft Corporation is usually used. It is preferable to use the standard filter from the viewpoint of ensuring compatibility and/or improving development efficiency, and the like.

In some cases, a background pattern or the like (an image configured of a repeat of a unit image) is included in a document to be printed.

However, there is a problem that when XPS data for printing such a background pattern or the like (an image configured of a repeat of a unit image) is converted into PCL by using the standard filter, a data amount increases.

For example, although a "background pattern" is described with image data of a unit image and a repeat command for the data in XPS data, the "background pattern" is expanded to a plurality of image data in PCL data converted by the standard filter. As a result, a data amount of the converted PCL data increases. The increase in data amounts leads to an increase in a communication load, an increase in communication time, and the like in data transmission from a print control apparatus (personal computer) including a printer driver therein to print-out apparatus (image forming apparatus or the like).

The problem of increased data amounts in PDL conversion processes is not limited to a conversion process from XPS to PCL, and may occur in various conversion processes.

SUMMARY OF THE INVENTION

Therefore, an object of the present invention is to provide technology capable of suppressing an increase in a data amount in a conversion process from a page description language (PDL) to another PDL.

To achieve the abovementioned object, according to an aspect, a non-transitory recording medium storing a computer readable program reflecting one aspect of the present invention causes a computer to execute: a) analyzing first page description language data that is unconverted data described in a first page description language to determine whether a repetitive pattern image portion is included in the first page description language data; b) separating the repetitive pattern image portion from the first page description language data when it is determined that the repetitive pattern image portion is included in the first page description language data; c) generating first partial data in a second page description language by using a unit image repetitive rendering command that is a rendering command to render the repetitive pattern image portion of the first page description language data by using a single image datum relating to a unit image; d) generating second partial data in the second page description language based on a portion other than the repetitive pattern image portion of the first page description language data; and e) generating converted data that relates to the first page description language data and is second page description language data described in the second page description language based on the first partial data and the second partial data.

According to an invention of Item. 2, in the non-transitory recording medium storing a computer readable program of Item. 1, the d) preferably comprises: generating the second partial data by using a general-purpose conversion program that performs a conversion process from the first page description language data to the second page description language data.

According to an invention of Item. 3, in the non-transitory recording medium storing a computer readable program of Item. 1 or 2, the b) preferably comprises: b-1) identifying a two-dimensional position of the repetitive pattern image portion in a rendering page, and the first partial data generated in the c) preferably includes specification of a rendering position for rendering the repetitive pattern image portion in the two-dimensional position identified in the b-1).

According to, to an invention of Item. 4, in the non-transitory recording medium storing a computer readable program of any of Items. 1 to 3, the preferably comprises: b-2) identifying a description position of the repetitive pattern image portion in the first page description language data, and the e) preferably comprises: generating the second page description language data by inserting the first partial data in a position corresponding to the description position identified in the b-2) in the second partial data.

According to an invention of Item. 5, in the non-transitory recording medium storing a computer readable program of any of Items. 1 to 4, the e) preferably comprises: e-1) describing the first partial data after the second partial data in the second page description language data when it is determined that the repetitive pattern image is to be rendered on a front-surface side of a partial image other than the repetitive pattern image; and e-2) describing the second partial data after the first partial data in the second page description language data when it is determined that the repetitive pattern image is to be rendered on a back-surface side of a partial image other than the repetitive pattern image.

According to an invention of Item. 6, in the non-transitory recording medium storing a computer readable program of any of Items. 1 to 5, the first page description language is preferably extensible markup language (XML) paper specification (XPS), and the second page description language is preferably printer command language (PCL).

According to an invention of Item. 7, in the non-transitory recording medium storing a computer readable program of any of Items. 1 to 6, the repetitive pattern is preferably a background pattern image, and the unit image is preferably a unit image that constitutes the background pattern image.

According to an invention of Item. 8, in the non-transitory recording medium storing a computer readable program of any of Items. 1 to 6, the repetitive pattern is preferably a fill pattern in an application program, and the unit image is preferably a unit image that constitutes the fill pattern.

To achieve the abovementioned object, according to an aspect, a print control apparatus reflecting one aspect of the present invention comprises: a determination unit that analyzes first page description language data that is unconverted data described in a first page description language to determine whether a repetitive pattern image portion is included in the first page description language data; a separation unit that separates the repetitive pattern image portion from the first page description language data when it is determined that the repetitive pattern image portion is included in the first page description language data; a first generation unit that generates first partial data in a second page description language by using a unit image repetitive rendering command that is a rendering command to render the repetitive pattern image portion of the first page description language data by using a single image datum relating to a unit image; a second generation unit that generates second partial data in the second page description language based on a portion other than the repetitive pattern image portion of the first page description language data; and a synthesis unit that generates converted data that relates to the first page description language data and is second page description language data described in the second page description language based on the first partial data and the second partial data.

According to an invention of Item. 10, in the print control apparatus of Item. 9, the second generation unit preferably generates the second partial data by using a general-purpose conversion program that performs a conversion process from the first page description language data to the second page description language data.

According to an invention of Item. 11, in the print control apparatus of Item. 9 or 10, the separation unit preferably identifies a two-dimensional position of the repetitive pattern image portion in a rendering page, and the first partial data preferably includes specification of a rendering position for rendering the repetitive pattern image portion in the two-dimensional position.

According to an invention of Item. 12, in the print control apparatus of any of Items. 9 to 11, the separation unit preferably identifies a description position of the repetitive pattern image portion in the first page description language data, and the synthesis unit preferably generates the second page description language data by inserting the first partial data in a position corresponding to the description position identified by the separation unit in the second partial data.

According to an invention of Item. 13, in the print control apparatus of any of Items. 9 to 12, the synthesis unit preferably describes the first partial data after the second partial data in the second page description language data when it is determined that the repetitive pattern image is to be rendered on a front-surface side of a partial image other than the repetitive pattern image, and the synthesis unit preferably describes the second partial data after the first partial data in the second page description language data when it is determined that the repetitive pattern image is to be rendered on a back-surface side of a partial image other than the repetitive pattern image.

According to an invention of Item. 14, in the print control apparatus of any of Items. 9 to 13, the first page description language is preferably extensible markup language (XML) paper specification (XPS), and the second page description language is preferably printer command language (PCL).

According to an invention of Item. 15, in the print control apparatus of any of Items. 9 to 14, the repetitive pattern is preferably a background pattern image, and the unit image is preferably a unit image that constitutes the background pattern image.

According to an invention of Item. 16, in the print control apparatus of any of Items. 9 to 14, the repetitive pattern is preferably a fill pattern in an application program, and the unit image is preferably a unit image that constitutes the fill pattern.

To achieve the abovementioned object, according to an aspect, a print control system reflecting one aspect of the present invention comprises: a print control apparatus; and a printing apparatus that performs print-out based on a print command from the print control apparatus, wherein the print control apparatus comprises: a determination unit that analyzes first page description language data that is unconverted data described in a first page description language to determine whether a repetitive pattern image portion is included in the first page description language data; a separation unit that separates the repetitive pattern image portion from the first page description language data when it is determined that the repetitive pattern image portion is included in the first page description language data; a first generation unit that generates first partial data in a second page description language by using a unit image repetitive rendering command that is a rendering command to render the repetitive pattern image portion of the first page description language data by using a single image datum relating to a unit image; a second generation unit that generates second partial data in the second page description language based on a portion other than the repetitive pattern image portion of the first page description language data; and a synthesis unit that generates converted data that relates to the first page description language data and is second page description language data described in the second page description language based on the first partial data and the second partial data.

BRIEF DESCRIPTION OF THE DRAWINGS

The above and other objects, advantages and features of the present, invention will become more fully understood from the detailed description given hereinbelow and the appended drawings which are given by way of illustration only, and thus are not intended as a definition of the limits of the present invention, and wherein:

FIG. 7 illustrates unconverted. PDL data (XPS data);

FIG. 8 illustrates converted PDL data (PCL data);

FIG. 10 illustrates converted PDL data (PCL data);

FIG. 14 illustrates unconverted PDL data (XPS data);

FIG. 15 illustrates converted PDL data (PCL data);

FIG. 18 illustrates converted PDL data (PCL data) according to the comparative example; and FIG. 19 illustrates converted PDL data (PCL data) according to the comparative example.

DESCRIPTION OF THE PREFERRED EMBODIMENTS

Hereinafter, an embodiment of the present invention will be described with reference to the drawings. However, the scope of the invention is not limited to the illustrated examples.

1. First Embodiment

<1-1. Summary of Configuration>

Figure 1:
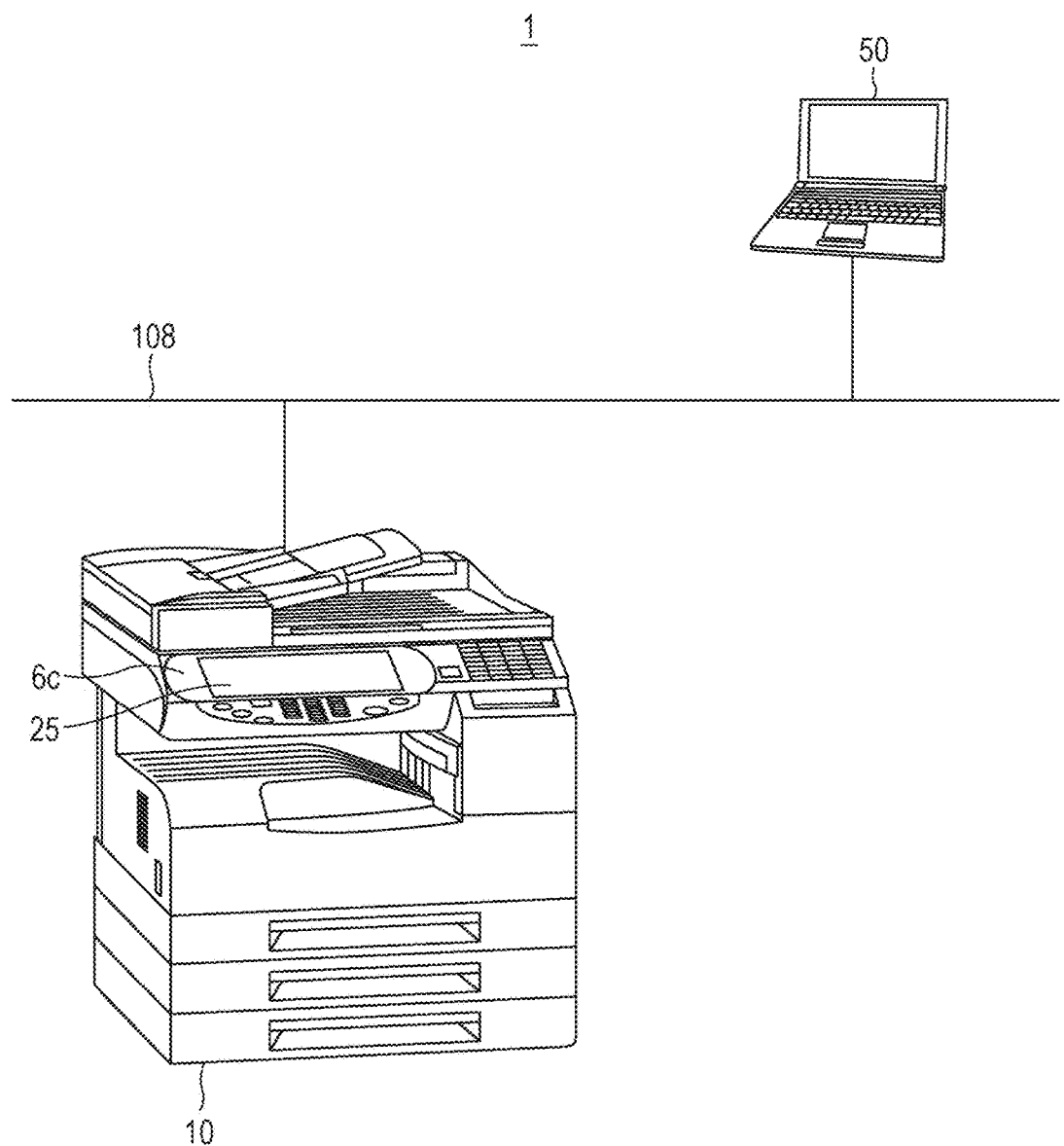
FIG. 1 is a schematic view illustrating a configuration of a print system according to an embodiment of the present invention.

FIG. 1 is a schematic view illustrating a configuration of print system 1 according to an embodiment of the present invention. As illustrated in FIG. 1, the print system 1 includes a multi-functional peripheral (may be abbreviated as MFP) 10 and a computer 50.

The MFP 10 and the computer 50 are connected through a network 108, and it is possible to transmit and receive data between respective apparatuses 10, 50. Examples of the network 108 include various networks such as a local area network (LAN) and the Internet.

The computer 50 is a computer used by a user of the MFP 10.

A print control program (here, a printer driver) is installed on the computer 50, and the computer 50 functions as a print control apparatus and the like for controlling print-out in MFP 10.

<MFP 10>

The MFP 10 is an apparatus having a scanner function, a printer function, a copy function, a facsimile communication function, and the like (the apparatus is also referred to as a multifunction product or an image forming apparatus).

In particular, the MFP 10 functions as a printer which performs print-out based on a print command from the computer 50 (the printer is also referred to as an image forming apparatus or a print-out apparatus). Specifically, the computer 50 receives a print execution instruction from a user through a print control program (printer driver) or the like installed on the computer (print control apparatus) 50, and transmits a print job (print command) to the MFP 10 in accordance with the print-out instruction. The MET 10 receives the print job transmitted from the computer 50, and executes the print job. Consequently, a print-out process by the MFP 10 is executed.

Figure 2:
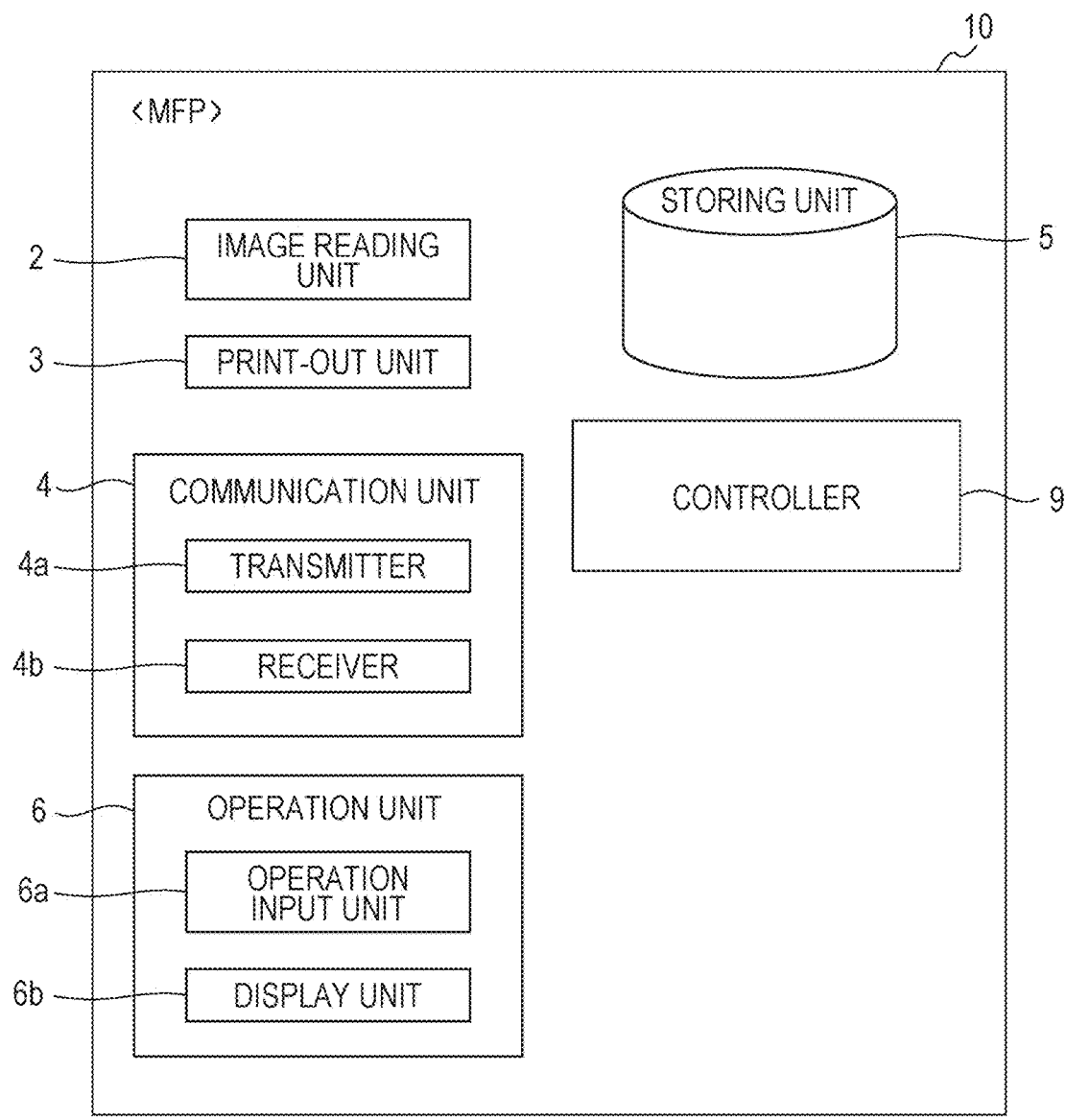
FIG. 2 is a block diagram illustrating a functional configuration of an NFP (image forming apparatus)

Specifically, as illustrated in the functional block diagram in FIG. 2, the NFP 10 includes an image reading unit 2, a print-out unit 3, a communication unit 4, a storing unit 5, an operation unit 6, and a controller 9, and realizes various functions by operating these units in a combined manner.

The image reading unit 2 is a processing unit which optically reads a document placed on a predetermined position in the MFP 10 and generates image data of the document (also referred to as a document image).

The print-out unit 3 is an output unit which prints out an image on various media such as paper based on image data relating to an image of interest.

The communication unit 4 is a processing unit capable of performing facsimile communication through a public line, or the like. In addition, the communication unit 4 is capable of performing network communication through the communication network 108. In the network communication, various protocols such as a transmission control protocol/internet protocol (TCP/IP) and a file transfer protocol (FTP) are used, and by using the network communication, the MFP 10 can transmit and receive various data to and from a desired partner apparatus. In addition, by using the network communication, the MFP 10 can receive a print job from the computer (print control apparatus) 50.

The storing unit 5 includes a storing device such as a hard disk drive (HDD). Various image data and the like are stored in the storing unit 5.

The operation unit 6 includes an operation input unit 6a and a display unit 6b. The operation input unit 6a receives an input to the MFP 10, and the display unit 6b performs display output of various kinds of information.

The MFP 10 is provided with an operation panel unit 6c (see FIG. 1). The operation panel unit 6c has a touch panel 25 (see FIG. 1) on the front side thereof. The touch panel 25 functions as a part of the operation input unit 6a, and also as a part of the display unit 6b. The touch panel 25 is constituted by a liquid crystal display panel having various sensors and the like embedded therein, displays various kinds of information and can receive various operation inputs from an operator.

The controller 9 is a control device which is included in the MFP 10 and integrally controls the MFP 10, and configured to include a CPU and various semiconductor memories (RAN, ROM, and the like).

<Computer 50>

The computer 50 is configured as a so-called personal computer.

On the computer 50, a predetermined operating system (OS) is installed. The print control program (printer driver) is called (activated) in accordance with an activation command from a user in an application software program or the like in the computer 50, and executed.

The print control program is a program which controls print-out by the MFP 10 (program for print control), and is a program used by a user of the MET 10 in the computer 50 or the like. The print control program (printer driver) performs a print setting operation in accordance with the content of print setting (print setting value) obtained by an input operation or the like of an operator (user), and executes a print control operation to the MFP 10 (printer). Then, the MFP 10 performs a print-out operation based on the print control operation by the printer driver. In the manner as described above, the computer 50 functions as a print control apparatus which controls print-out by the MFP 10 (printer) by using the printer driver.

Figure 3:
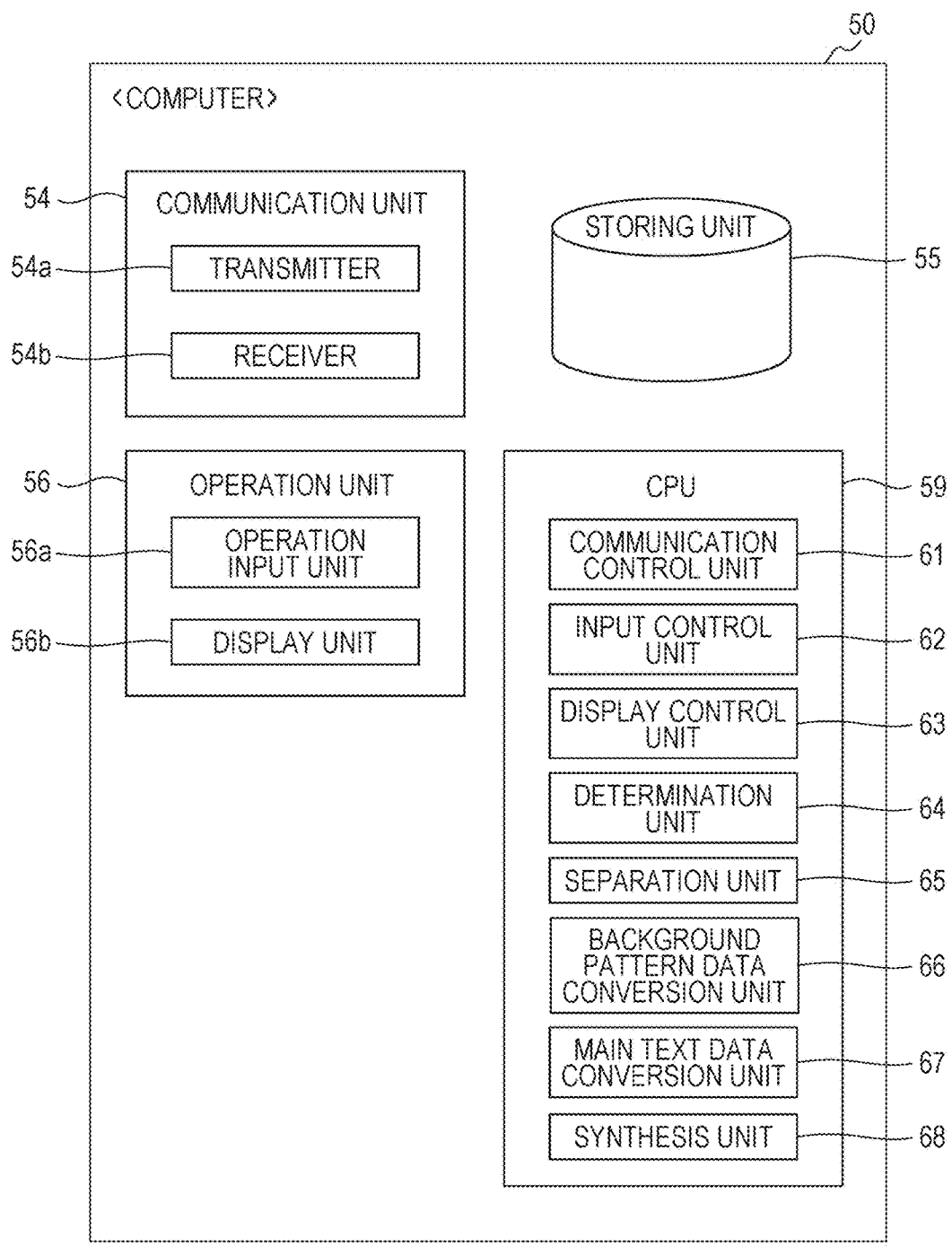
FIG. 3 is a block diagram illustrating a functional configuration of a print control apparatus.

FIG. 3 is a block diagram illustrating a functional configuration of the computer (print control apparatus) 50.

As illustrated in FIG. 3, the computer 50 is configured to include a communication unit 54, a storing unit 55 (a semiconductor memory (such as a RAM), a hard disk drive and the like), an operation unit 56, and a CPU 59.

The communication unit 54 can perform network communication through the communication network 108. In the network communication, various protocols such as TCP/IP are used. The computer 50 can transmit and receive various data to and from a desired partner apparatus by using the network communication.

The operation unit 56 includes an operation input unit 56a and a display unit 56b. The operation input unit 56a receives an operation input to the computer 50, and the display unit 56b performs display output of various kinds of information. As the operation input unit 56a, a keyboard, a mouse, and the like are provided, and as the display unit 56b, a liquid crystal display device or the like is provided. The operation unit 56 receives print setting with respect to various setting items of the printer driver.

In addition, the computer 50 realizes various processing units by executing, in the CPU 59 thereof, a predetermined software program (hereinafter, also referred to as program, simply) stored in the storing unit 55 (hard disk drive and/or semiconductor memory). The program (such as a printer driver) may be recorded in a portable recording medium such as a USB memory, and installed on the computer 50 through the recording medium. Alternatively, the program may be downloaded through the network 108 or the like and installed on the computer 50.

Specifically, the computer 50 includes a communication control unit 61, an input control unit 62, a display control unit 63, a determination unit 64, a separation unit 65, a background pattern data conversion unit 66, a main text data conversion unit 67, and a synthesis unit 68.

The input control unit 62 is a control unit which controls an operation-inputting operation with respect to the operation input unit 56a.

The display control unit 63 is a processing unit which controls a display operation in the display unit 56b.

The determination unit 64 is a processing unit which analyzes XPS data 300 described in the extensible markup language (XML) paper specification (XPS) (see FIG. 4) to determine whether a "repetitive pattern image portion" (for example, "background pattern") is included in the XPS data 300.

The separation unit 65 is a processing unit which separates the repetitive pattern image portion from the XPS data 300.

Figure 4:
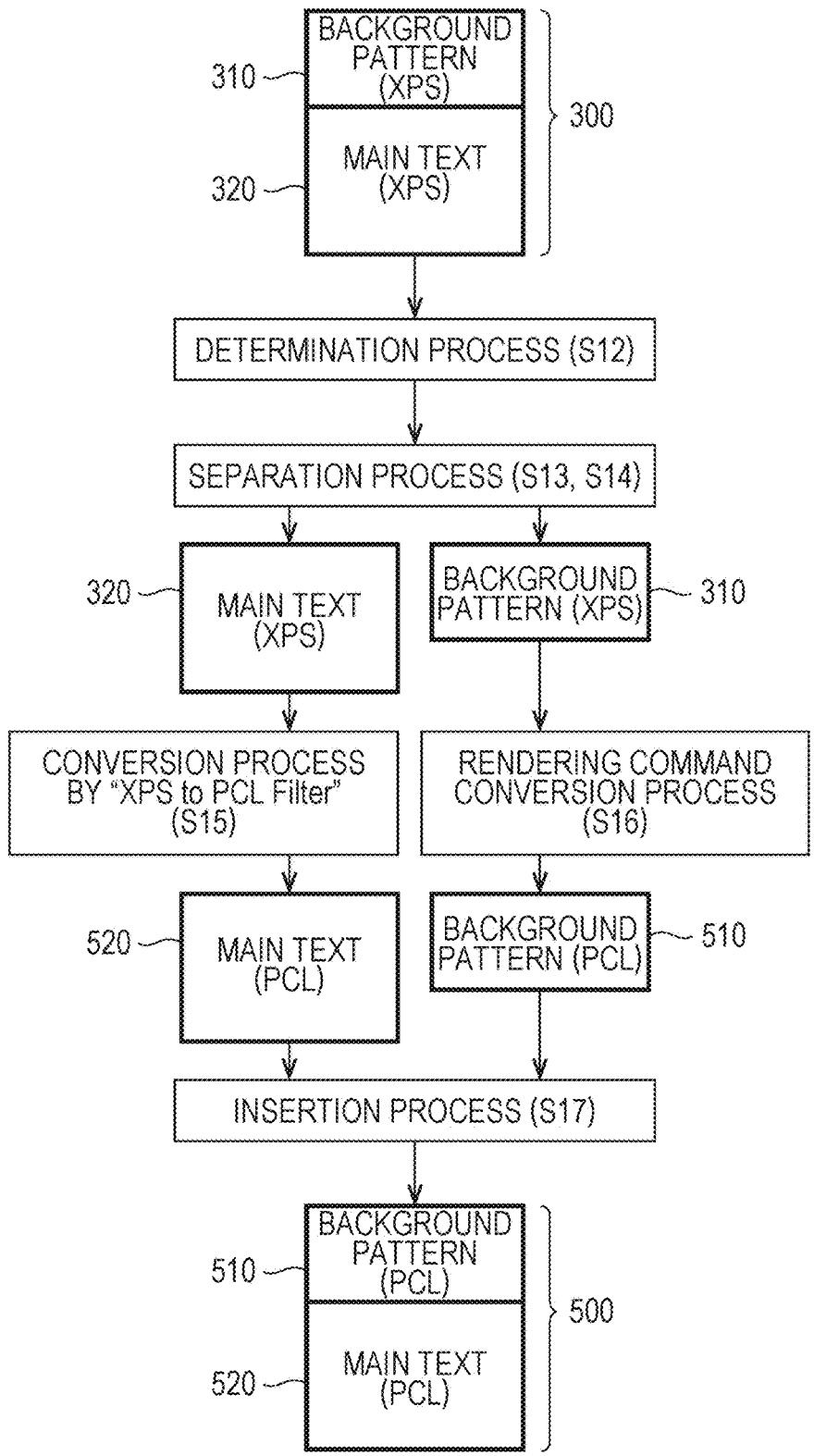
FIG. 4 is a conceptual diagram illustrating a control operation (in particular, a conversion process of PDL) by a computer (print control apparatus)

The background pattern data conversion unit 66 is a processing unit which converts the repetitive pattern image portion 310 in the XPS data 300 to partial data 510 in a printer command language (PCL) (see FIG. 4). The background pattern data conversion unit 66 generates first partial data 510 in PCL by using a "unit image repetitive rendering command" (described later).

The main text data conversion unit 67 is a processing unit which generates second partial data 520 in PCL based on a portion 320 of the XPS data 300, which portion being other than the repetitive pattern image portion (see FIG. 4).

The synthesis unit 68 is a processing unit which generates converted PCL data (whole data) 500 based on the first partial data 510 and the second partial data 520 (see FIG. 4).

<1-2. Outline of Operation>

Figure 17:
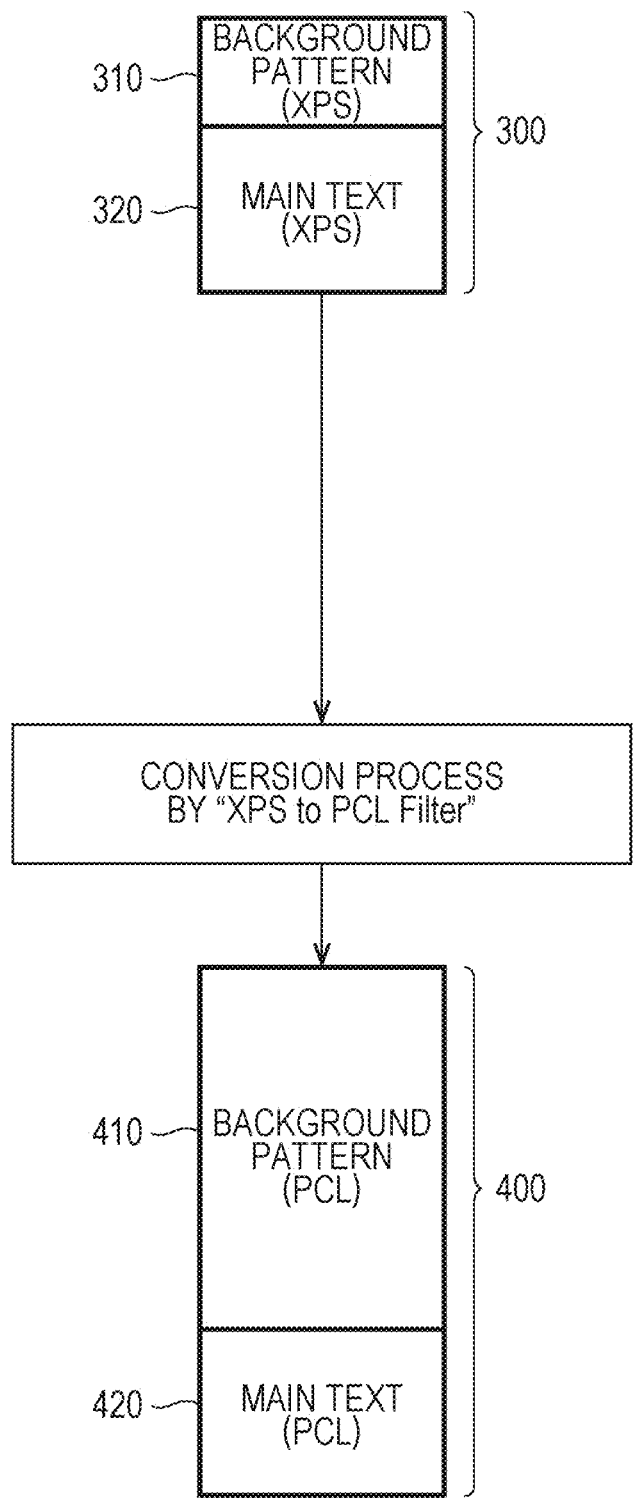
FIG. 17 is a conceptual diagram illustrating an operation according to a comparative example.

FIG. 4 is a conceptual diagram illustrating an operation according to the embodiment of the present invention. FIG. 17 is a conceptual diagram illustrating an operation according to a comparative example. In these drawings, an aspect is exemplified in which a document including a background pattern and a main text is printed out. Hereinbelow, first, the outline of a print control operation will be described with reference to these drawings.

The comparative example (FIG. 17) illustrates that upper PDL data 300 described in XPS is converted to lower PDL data 400 described in PCL by using a general-purpose conversion program ("XPS to PCL filter") provided by Microsoft Corporation. The general-purpose conversion program (conversion program which performs a conversion process from XPS to PCL) is also referred to as a "standard filter" (for performing a conversion process from XPS to PCL).

Figure 6:
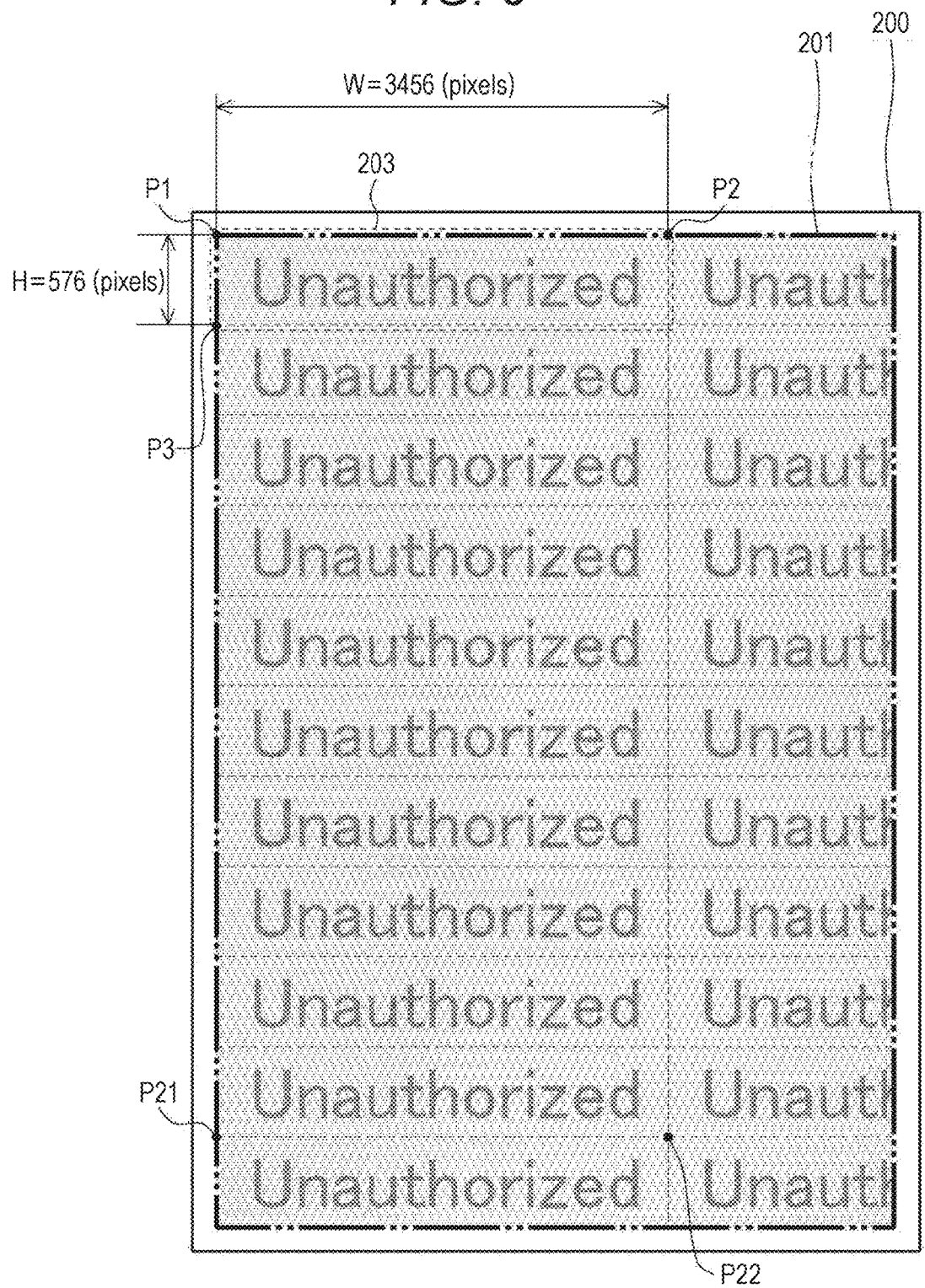
FIG. 6 illustrates an example of a background pattern.

As illustrated in FIG. 17, when all of the XPS data 300 is processed with the standard filter, the PCL data 400 is generated with the unit image expanded (in other words, with the data amount increased) in order to represent the background pattern (see FIG. 6).

Here, FIG. 6 illustrates an example of the background pattern. In FIG. 6, an image including a text "Unauthorized" and a pattern (in the drawing, a sand pattern) is exemplified as a "background pattern" (background pattern image). In FIG. 6, a unit image 203 for representing the background pattern is repeatedly aligned. Specifically, the numbers of the background pattern images (unit images) 203 are 11 and 2 in a vertical direction and a horizontal direction, respectively, and therefore, 22 (2 columns×11 rows) background pattern images (unit images) 203 in total are disposed so as to cover substantially the whole surface of a sheet. Regarding each unit image 203 disposed to the right side column, only a part of an area of each unit image 203 (area about the left one third of each unit image 203 in the right side column) is rendered such that each unit image 203 thus rendered is included in the sheet (specifically, a rendering area 201 (area excluding margins of the sheet)).

In the unconverted PDL data (XPS data) 300 (FIG. 7), it is described (in a so-called "non-expanded manner") regarding the "background pattern", that the unit image (unit image data) 203 for representing the background pattern is disposed repeatedly (see FIG. 7). FIG. 7 illustrates an example (a part) of the unconverted PDL data (XPS data).

For example, in the XPS data in FIG. 7, it is specified that a predetermined range is completely covered in a "Tile" mode with image data having a file name "bg.png" (unit image 203 including the text "Unauthorized" and the pattern). The predetermined range is a rectangular area 200 defined by "Path Data" (see FIG. 6), which is, specifically, an area over the whole surface of a letter-sized (8.5 inches× 11 inches) sheet.

Here, the "Tile" mode (TileMode="Tile") (see a portion V1 in FIG. 7) is a command for specifying that a specified image is repeatedly disposed (tiled) in a specified range. A size of the image data of "bg.png" is 3456 pixels×576 pixels. The rectangular area 200 is defined in FIG. 7 by coordinates of an upper left point (0,0) and coordinates of a lower right point (816,1056) (coordinate values in "1/96 inch" unit system). The coordinate values "816" and "1056" in the "1/96 inch" unit system are converted to "5100" (=816*600/96) and "6600" (dots (pixels)) respectively, in a pixel coordinate system relating to print-out at 600 dpi. Here, it is assumed that, of the whole sheet, an area excluding margins of the sheet (areas in upper, lower, right, and left end portions, respectively, each of which has a width of 100 pixels) is determined as the actual rendering area 201. The length in a lateral direction (width) of the rendering area 201 is 4900 pixels (=5100−100−100), and the length in a vertical direction thereof is 6400 pixels (=6600−100−100).

On the other hand, in the converted PDL data (PCL data) according to the comparative example (FIG. 17), the "background pattern" is described as expanded image data for one page (in a so-called "expanded manner") (see FIGS. 18 and 19). In more detail, the expanded image data, which has been divided into a plurality of partial images, is described.

FIGS. 18 and 19 illustrate an example (a part) of the converted PDL data (PCL data).

For example, in the PCL data in FIGS. 18 and 19, the expanded image data for one page is divided into a plurality of partial images (1 column×88 rows) and the plurality of partial images is described together with specified positions thereof in an expanded manner. The expanded image has 4900 pixels (=5100−100−100) in a lateral direction.

In more detail, in a portion B61 in FIG. 18, image data (37344 bytes) with 4900 (dots (pixels)×72 (dots (pixels) itself is described, and it is described that the image data is disposed at a position (100, 100). In a portion B62 in FIG. 19, image data (34908 bytes) with 4900 (dots (pixels)×72 (dots (pixels) itself is described, and it is described that the image data is disposed at a position (100, 172). In a portion B63 in FIG. 19, image data (35822 bytes) with 4900 (dots (pixels)×72 (dots (pixels) itself is described, and it is described that the image data is disposed at a position (100,244). As with those described above, regarding the rest of the partial images, respective image data of the partial images themselves are described, and it is described that the respective image data are disposed at respective positions (specified positions).

In that case, a data amount of the PCL data (converted PDL data) increases in proportion to the number of repetitions in comparison to a data amount of the XPS data (unconverted PDL data). Specifically, of two portions 410, 420 (FIG. 17) which constitute the PCL data 400, a data amount of the portion 410 relating to the background pattern increases.

For example, regarding the background pattern image including about 15 unit images, a data amount of the converted PDL data (PCL data) 400 increases by about 15-fold or more in comparison to a data amount of the unconverted PDL data (XPS data) 300.

The increase in data amounts leads to an increase in a communication load, an increase in communication time, and the like in data transmission from a print control apparatus (personal computer) including a printer driver therein to print-out apparatus (image forming apparatus or the like).

Accordingly, in the embodiment, although the print control apparatus 50 performs a process with the standard filter to the portion excluding a part of the XPS data (repetitive pattern image portion (image portion corresponding to the repetitive pattern)), the print control apparatus 50 performs an exceptional process to the part. Specifically, as illustrated in FIG. 4, the process with the standard filter is performed to the "main text" portion (portion other than the "background pattern" portion which is the repetitive pattern image portion), and the exceptional process is performed to the "background pattern" portion which is the repetitive pattern image portion.

In the exceptional process, a "repeat command" in XPS is converted to a "repeat command" in PCL. In the converted "repeat command", it is specified that "a rendering area where the same image is repeatedly disposed is subjected to rendering using a single image datum indicating one image of the plurality of the same images disposed in the rendering area." in the "repeat command," it is not specified that "a rendering area where the same image is repeatedly disposed is subjected to rendering using multiple image data respectively indicating multiple same images disposed in the rendering area." In other words, in the "repeat command," the rendering area where the same image is repeatedly disposed is not represented by a plurality of expanded image data ("in an expanded manner"), but represented by using a single image datum. ("in a non-expanded manner").

Figure 9:
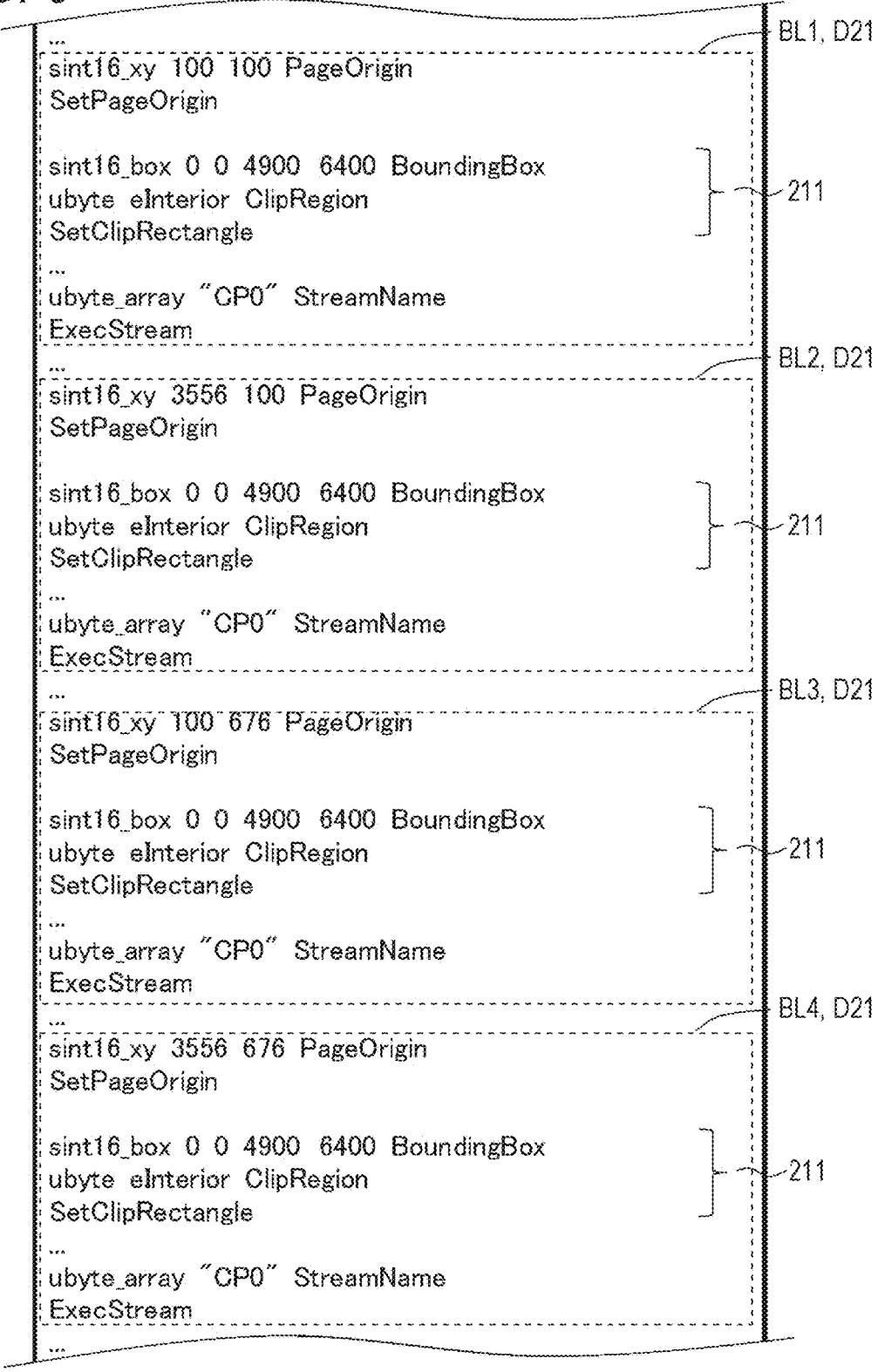
FIG. 9 illustrates converted PDL data (PCL data)

FIGS. 8 to 10 illustrate an example (a part) of the converted PDL data (PCL data) according to the embodiment. In the PCL data (see a portion BL0 in FIG. 8), the unit image 203 for representing the background pattern (see FIG. 6) is defined under the name of image "CP0." However, in the subsequent portions, it is repeatedly described that the defined image CP0 is rendered in each specified position. Specifically, a portion BL1 in FIG. 9, it is described that the defined image CP0 is disposed in a position P1 (100, 100), and in a portion BL2 in FIG. 9, it is described that the defined image CP0 is disposed in a position P2 (3556, 100). In a portion BL3 in FIG. 9, it is described that the defined image CP0 is disposed in a position P3 (100, 676), and in a portion BL4 in FIG. 9, it is described that the defined image CP0 is disposed in a position P4 (3556, 676). The same description is repeated also for other portions including a portion BL5 and subsequent portions (see also FIG. 10). Each position Pi is described as a coordinate value of a page coordinate system at print-out at 600 dpi.

Here, in the PCL data in FIGS. 8 to 10, the image data (entity data) of the unit image 203 is described only in the definition portion BL0 relating to the unit image 203 (FIG. 8). On the other hand, in other portions (the portion BL1 (FIG. 9) and subsequent portions), the image data (entity data) of the unit image 203 is not described, and the defined image CP0 is just called. In other words, although the unit image 203 is repeated when being printed out, the unit image 203 is described only once in the PCL data in FIGS. 8 to 10. In other words, in the PCL data in FIGS. 8 to 10, a "repetitive pattern image portion" (image portion corresponding to the repetitive pattern (area where the same image is repeatedly disposed)) is not represented by multiple image data respectively indicating multiple same images disposed in the "repetitive pattern image portion," but represented by a single image datum indicating one image of the multiple same images. In short, the "repetitive pattern image portion" is described by using a "repetitive rendering command" of the unit image 203. The "repetitive rendering command" is a command to repeatedly dispose the unit image, and in more detail, is a command to render the "repetitive pattern image portion" by using a single image datum relating to the unit image. Here, the "repetitive rendering command" is a rendering command which includes a portion D1 in which a single defined datum CP0 (image data of the unit image 203) is described (see FIG. 8) and a portion D2 (D21) in which it is described that each partial image is rendered in a specified position thereof by using the defined datum CP0 (see FIGS. 9 and 10).

In the PCL data in FIGS. 8 to 10, each "repetitive rendering command" includes a clip command to specify a rendering range (see a portion 211). According to this, each unit image 203 disposed to the right side column on the sheet is rendered so as to be included in a rendering area 201 (a rectangular area specified by coordinates of the upper left point (0,0) and coordinates of the lower right point (4900, 6400) (in a rendering area coordinate system)). A portion "protruded" from the rectangular area is not rendered.

<1-3. Details of Operation>

Figure 5:
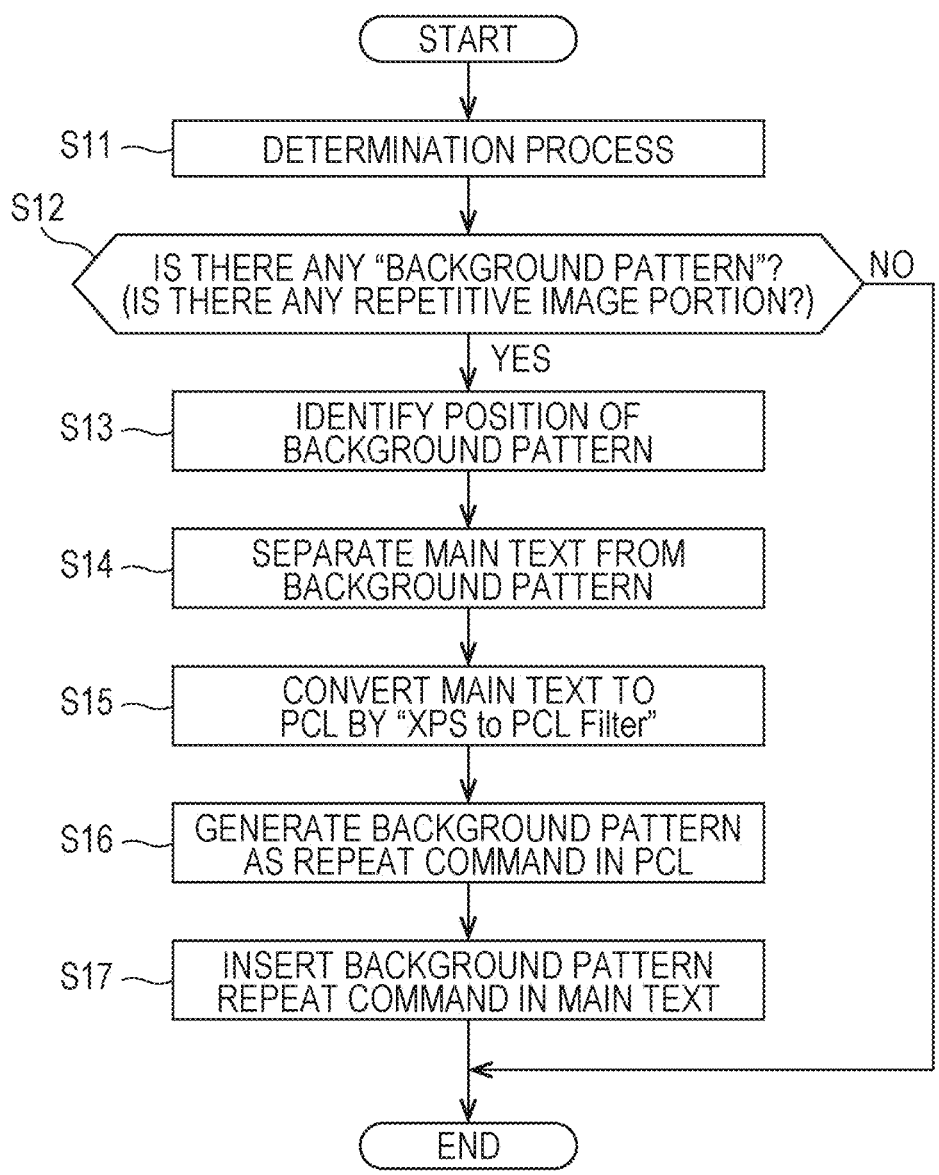
FIG. 5 is a flowchart illustrating a conversion process (conversion process from XPS to PCL) by the print control apparatus.

Next, the above-described operation will be described in more detail. FIG. 5 is a flowchart illustrating a conversion process (specifically, a conversion process from XPS data to PCL data) by the print control apparatus 50. When a process to be executed is the conversion process from XPS data to PCL data, the conversion process in FIG. 5 is executed.

Hereinbelow, the conversion process will be described in detail with reference to FIGS. 5, 4, and the like.

In Step S11, the print control apparatus 50 analyzes XPS data to be processed, and determines whether a "repetitive pattern image portion" (image portion corresponding to the repetitive pattern) is included in the XPS data. In other words, the presence of a pattern image portion which relates to a "repetitive rendering command" (command to render the unit image repeatedly) is determined.

For example, when a mode for a fill method is specified as "Tile" mode (TileMode="Tile") as illustrated in FIG. 7 described above (see the portion V1 in FIG. 7), it is determined that the "repetitive pattern image portion" (background pattern image portion and the like) is included in the XPS data. However, there is no limitation thereto, and the presence of the "repetitive pattern image portion" may be determined based on the presence of a particular description other than "TileMode="Tile"" or the like.

When it is determined that the "repetitive pattern image portion" is included in the XPS data, the process proceeds to Step S13 from Step S12. When it is determined that the "repetitive pattern image portion" is not included in the XPS data, the process in FIG. 5 ends.

Next, the processes of Steps S13, S14 are performed. Specifically, the print control apparatus 50 extracts and separates the "repetitive pattern image portion" from the XPS data (Step S14). At that time, a position of the "repetitive pattern image portion" in the image (two-dimensional position) and a position of the "repetitive pattern image portion" in the XPS data (position described in the XPS data) are identified (Step S13).

In more detail, in Step S13, first, the two-dimensional position of the "repetitive pattern image portion" (background pattern) in a rendering page is identified. Specifically, the two-dimensional position of the "repetitive pattern image portion", which is a partial area filled in the "Tile" mode, specifically, coordinates of an upper left point (0,0) and coordinates of a lower right point (816,1056) (coordinate values in "1/96 inch" unit system) are acquired. The coordinate values may appropriately be converted to coordinate values in a coordinate system used in the PCL data (for example, values in a pixel coordinate system relating to print-out at 600 dpi).

In addition, a position (description position) of a description portion V0 (see FIG. 7) relating to the "repetitive pattern image portion (here, the background pattern)" in the XPS data is also identified in Step S13. In more detail, for example, it is identified that whether the description portion V0 relating to the "background pattern" is described in a position preceding a description portion relating to the "main text" (the portion is omitted in FIG. 7), or, conversely, the description portion V0 relating to the "background pattern" is described in a position succeeding the description portion relating to the "main text."

In addition, in Step S14, the print control apparatus 50 extracts and separates the "repetitive pattern image portion" from the XPS data 300. Consequently, partial data 310 (XPS data) relating to the "background pattern" ("repetitive pattern image portion") and partial data 320 (XPS data) relating to the "main text" are generated separately from each other.

In Step S15, the print control apparatus 50 generates partial data 520 (non-repetitive portion data (main text portion data)) based on data 320 of a portion (here, main text portion) of the XPS data relating to a portion other than the "repetitive pattern image portion" (see also FIG. 4, and the like). The partial data of the nonrepetitive portion (partial data mainly representing the main text) 520 is data in which the partial data 320 is described in PCL, and is generated by using the standard filter (general-purpose conversion program). In more detail, by performing a process by the standard filter to the partial data 320 in XPS, the partial data 520 in PCL is generated.

In addition, in Step S16, the print control apparatus 50 generates partial data (repetitive portion data) 510 described in PCL by using the "unit image repetitive rendering command" based on the "repetitive pattern image portion" (here, background pattern portion) 310 of the XPS data. The partial data of the repetitive portion (partial data representing the background pattern) 510 is not generated by using the standard filter, but generated by performing the exceptional process as described above. The partial data 510 includes, as illustrated in FIGS. 8 to 10 described above, the definition portion BL0 of the unit image 203, and rendering command portions BL1 to BL22 relating to a plurality of partial images. In each of the portions BL0 and BL1 to BL22, the "unit image repetitive rendering command" is described.

In Step S16, the PCL data 510 is generated by using information of the two-dimensional position identified in Step S13 (see FIGS. 8 to 10). The PCL data 510 includes specification of a rendering position for rendering the "repetitive pattern image portion" (here, "background pattern") in the two-dimensional position identified in Step S13. Here, rendering positions of multiple partial images are specified respectively, and then a rendering command to render each of the multiple partial images by using the single defined image (image data) CP0 is generated (in particular, see portions BL1, BL2, . . . and the like (FIG. 9)). For example, in the portion BL1, it is described that the defined image CP0 is disposed in the position P1 (100,100), and in the portion BL2, it is described that the defined image CP0 is disposed in the position P2 (3556,100).

In Step S17 subsequent thereto, the print control apparatus 50 generates converted PCL data relating to the original XPS data based on the repetitive portion data 510 and the non-repetitive portion data 520. Specifically, the print control apparatus 50 inserts the repetitive portion data 510 in an appropriate position (position corresponding to the position identified in Step S13 (position in the XPS data) (described later)) in the non-repetitive portion data 520 generated in Step S15. Consequently, the converted PCL data 500 is generated for the unconverted PDL data (XPS data) 300.

Then, thus generated PCL data 500 is transmitted to the MFP 10 from the print control apparatus 50, and print-out is executed in the MFP 10 based on the PCL data 500.

According to the aspect described above, only the non-repetitive portion data of the XPS data is converted to the PCL data by using the standard filter, and the repetitive portion data of the XPS data is converted to the "repetitive rendering command" relating to the unit image. Consequently, a data amount of the converted PCL data can be suppressed in comparison to a case where the whole XPS data is converted to PCL data by using the standard filter.

In Step S17 described above, superimposition of the "background pattern" and the "main text" (portion other than the background pattern), specifically, whether to overwrite the "background pattern" on the "main text" or to dispose (underwrite) the "background pattern" beneath (on a back-surface side of) the "main text", may be controlled in the following manner. Specifically, the control may be performed by changing the order of the partial data representing the "background pattern" and the partial data representing the "main text" (order in terms of description positions) in the converted PDL data (PCL data).

Figure 11:
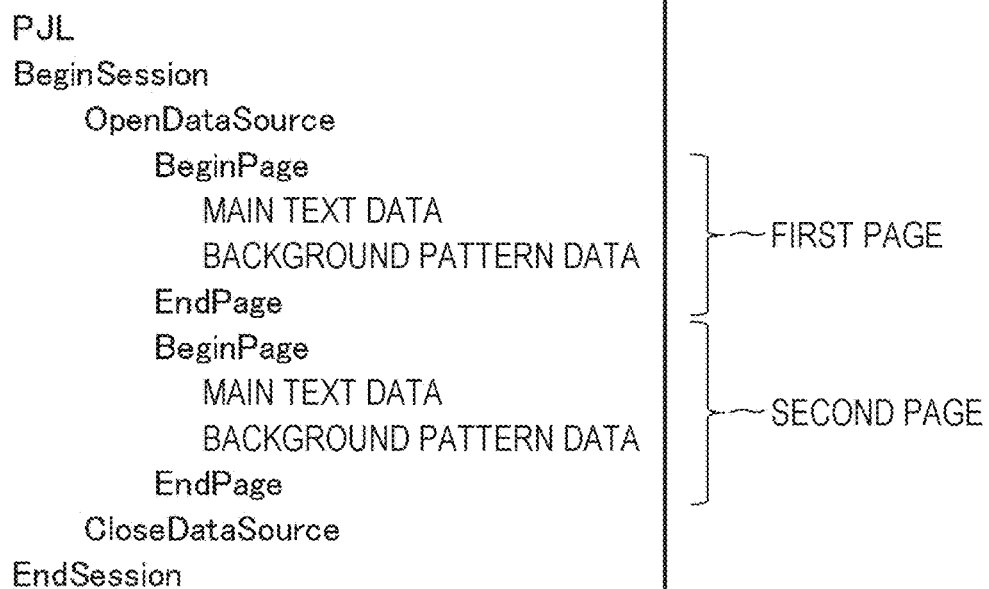
FIG. 11 illustrates converted PDL data (PCL data) when disposing (overwriting) a "background pattern" on a front-surface side of a "main text"

For example, when the "background pattern" is disposed (overwritten) above (on a front-surface side of) the "main text," the partial data of the "main text" is described before the partial data of the "background pattern" in the converted PDL data (PCL data) (in more detail, a description portion of each page) as illustrated in FIG. 11. In other words, the partial data of the "background pattern" is described after the partial data of the "main text." Accordingly, in a rasterizing process based on. POT, image data of the "main text" is expanded and then image data of the "background pattern" is superimposed on the image data of the "main text," and therefore, the "background pattern" is disposed above (on the front side of) the "main text."

Figure 12:
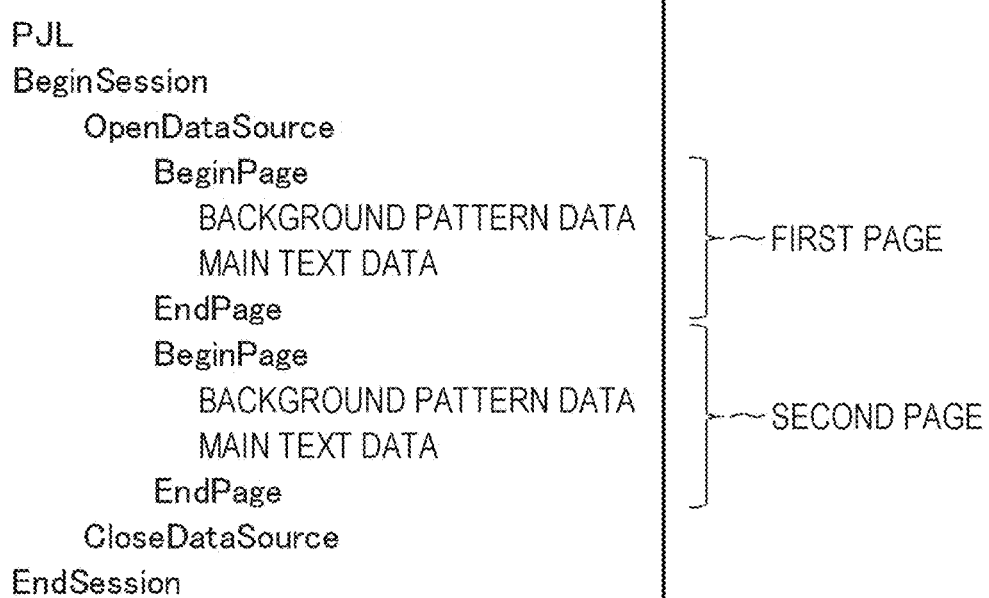
FIG. 12 illustrates converted PDL data (PCL data) when disposing (underwriting) the "background pattern" on a back-surface side of the "main text"

Conversely, when the "background pattern" is disposed (underwritten) beneath (on the back-surface side of) the "main text," the partial data of the "background pattern" is described before the partial data of the "main text" in the converted PDL data (PCL data) (in more detail, a description portion of each page) as illustrated in FIG. 12. In other words, the partial data of the "main text" is described after the partial data of the "background pattern". Accordingly, in a rasterizing process based on PCL, image data of the "background pattern" is expanded and then image data of the "main text" is superimposed on the image data of the "background pattern," and therefore, the "background pattern" is disposed beneath (on the back-surface side of) the "main text."

In addition, a positional relationship (relationship between the description positions of respective portions in terms of the order thereof) acquired in Step S13 is preferably passed to Step S17. In other words, the relationship in terms of superimposition in the unconverted PDL data (XPS data) (relationship in terms of superimposition acquired in Step S13 and the like) is preferably maintained in the converted PDL data (PCL data). The relationship in terms of superimposition in the unconverted PDL data may be determined based on the relationship in terms of the order of the partial data of the "background pattern" and the partial data of the "main text" in the PDL data (XPS data).

For example, when the partial data of the "main text" is described before the partial data of the "background pattern" in the XPS data, it may be determined that overwriting of the "background pattern" on the "main text" is specified. In that case, it may be determined that the "background pattern" is rendered on the front-surface side of the "main text" in the PCL data as well, and the partial data of the "background pattern" may be described after the partial data of the "main text" in the PCL data. In other words, the partial data 510 of the "background pattern" may be inserted in a position (position after the "main text") corresponding to the description position identified in Step S13 (description position of the partial data 310) in the PCL data 500.

Conversely, when the partial data of the "background pattern" is described before the partial data of the "main text" in the XPS data, it may be determined that disposition (underwriting) of the "background pattern" beneath (on the back-surface side of) the "main text" is specified. In that case, it may be determined that the "background pattern" is rendered on the back-surface side of the "main text," and the partial data of the "background pattern" may be described before the partial data of the "main text" in the PCL data. In other words, the partial data 510 of the "background pattern" may be inserted in a position (position before the "main text") corresponding to the description position identified in Step S13 (description position of the partial data 310) in the PCL data 500.

2. Second Embodiment

In the first embodiment described above, the portion relating to "background pattern" is exemplified as the repetitive pattern image portion. In other words, in the first embodiment described above, the "repetitive pattern" is a background pattern image and the "unit image" is a unit image which constitutes the background pattern image.

In the second embodiment, a "portion relating to a fill pattern in an application program" is exemplified as a repetitive pattern image portion. In other words, in the second embodiment, a "repetitive pattern" is a fill pattern in an application program, and a "unit image" is a unit image which constitutes the fill pattern.

Figure 13:
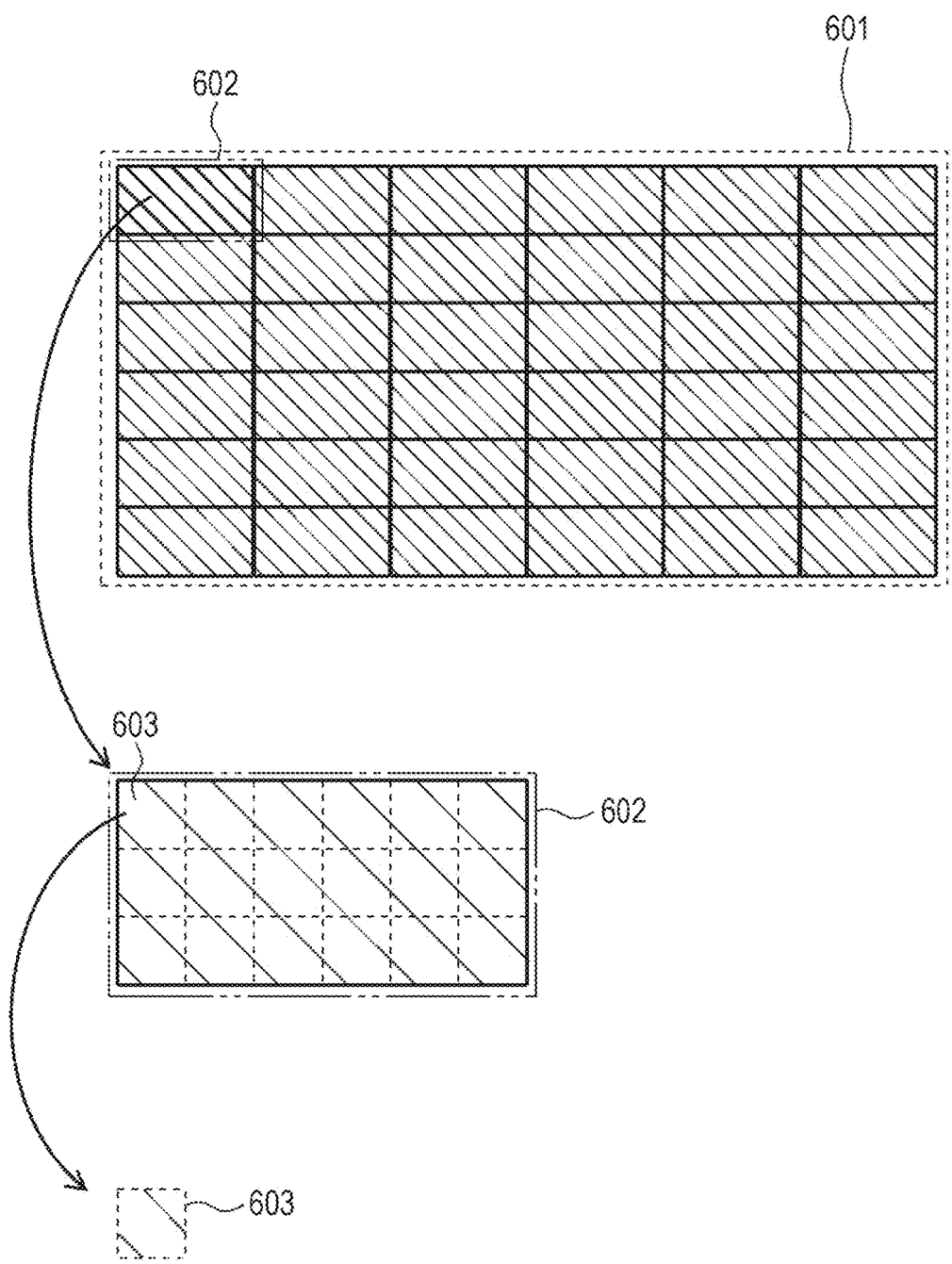
FIG. 13 illustrates a document to be printed in a second embodiment.

FIG. 13 illustrates that each cell 602 is filled with the "fill pattern" in a spreadsheet software (such as EXCEL™). In FIG. 13, a plurality of cells 602 in a predetermined range 601 is filled in the same pattern, and each of cells 602 is represented by repetition of a unit image 603.

Specifically, in unconverted PDL data (XPS data) (FIG. 14), it is described (in a so-called "non-expanded manner"), regarding a "background pattern", that the unit image (unit image data) 603 for representing the background pattern is disposed repeatedly. FIG. 14 illustrates an example (a part) of the unconverted PDL data (XPS data).

For example, in the XPS data in FIG. 14, it is specified that the predetermined range 601 is completely covered in a "Tile" mode by using image data having a file name "1.PNG" ("unit image constituting a diagonal stroke") (603). The predetermined range 601 is a rectangular area defined by "Path Data" (see FIG. 13). Here, the "Tile" mode (TileMode="Tile") (see a portion V2 in FIG. 14) is also represented as a command for specifying that a specified image is repeatedly disposed in a specified range.

Here, if the whole XPS data in FIG. 14 is subjected to a process using the standard filter, PCL data is generated with image data expanded. In that case, the same problem as above (increase in data amounts) is generated.

Also in the second embodiment, only the non-repetitive portion data of the XPS data is converted to the PCL data by using the standard filter, and the repetitive portion data of the XPS data is converted to a "repetitive rendering command" relating to the unit image. Consequently, a data amount of the converted PCL data can be suppressed in comparison to a case where the whole XPS data is converted to PCL data by using the standard filter (the whole predetermined range 601 is expanded as image data).

Figure 16:
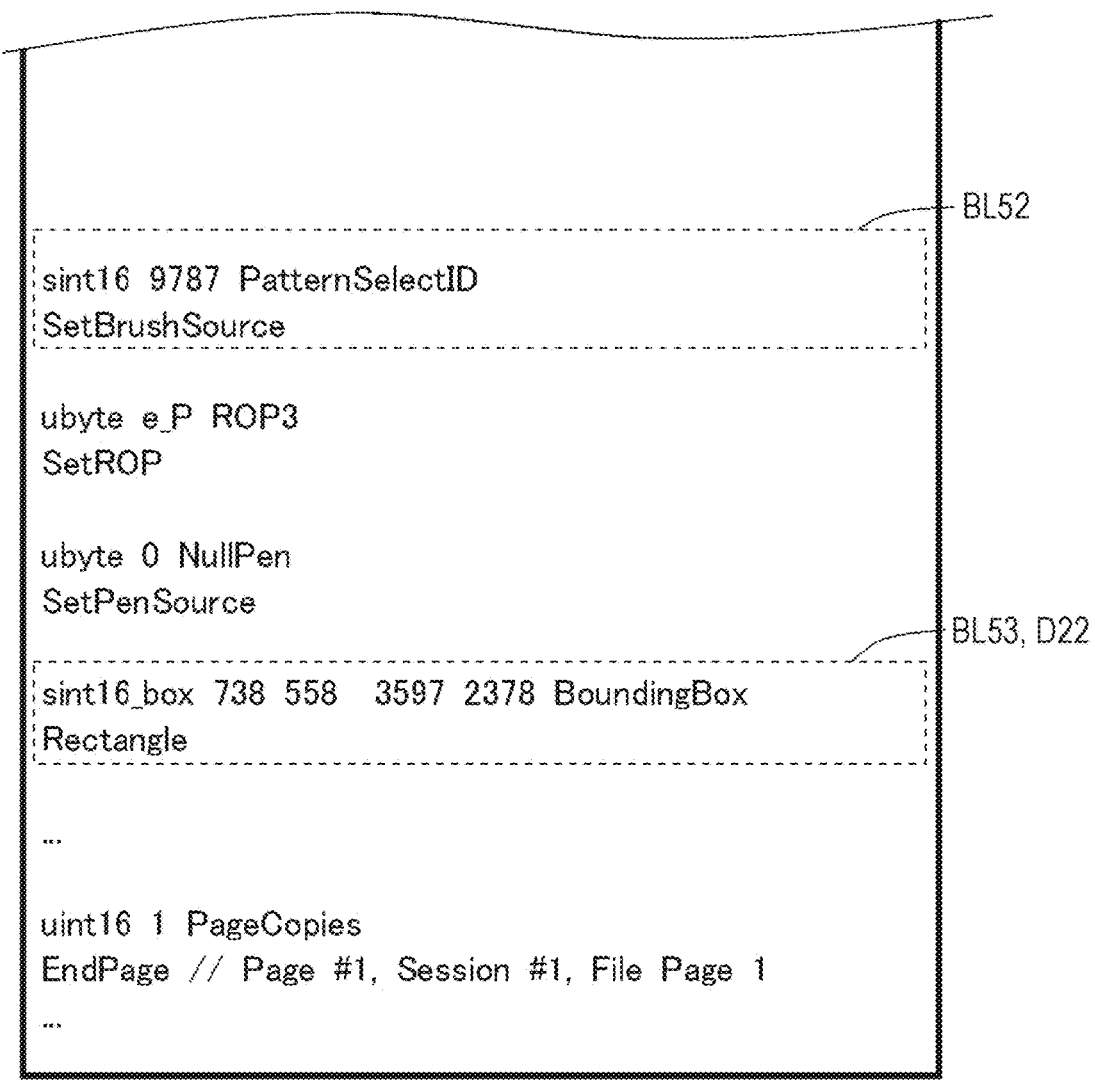
FIG. 16 illustrates converted PDL data (PCL data)

FIGS. 15 and 16 illustrate an example (a part) of the converted PDL data (PCL data). In the PCL data, the unit image 603 for representing a basic pattern (see FIG. 13) is defined (see a portion BL51 in FIG. 15 and a portion BL52 in FIG. 16). Specifically, an image of 32 bytes is defined as an image with a pattern ID value of "9787" ("PatternID"="9787") (see the portion BL51 in FIG. 15), and the image of "PatternID"="9787" is defined as an image for "brush" (see the portion BL52 in FIG. 16). The brush is defined by the unit image 603, and then a command to render a rectangle in the predetermined range 601 is described (see a portion BL53 in FIG. 16). In other words, a command to render a rectangle filled by the brush is given.

In the portion BL53, a two-dimensional position of the repetitive pattern is also specified. Specifically, a rectangular area 601 as an area to be subjected to a fill process by the brush is specified by using coordinates of the upper left point (738,558) and coordinates of the upper right point (3597, 2378). As described above, the portion BL53 includes specification of a rendering position for rendering the repetitive pattern image portion.

Here, in the PCL data in FIGS. 15 and 16, image data (entity data) of the unit image 603 is described only in the definition portion BL51 relating to the unit image 603. On the other hand, in other portions (the portion BL52 and subsequent portions), the image data (entity data) of the unit image 603 is not described, and a command to render a rectangle by using the defined image for the brush is just described. In other words, although the unit image 603 is repeated when being printed out, the unit image 603 is described only once in the PCL data in FIGS. 15 and 16. In other words, in the PCL data in FIGS. 15 and 16, the "repetitive pattern image portion (601)" (rendering area where the same image is repeatedly disposed) is not represented by multiple image data respectively indicating same multiple images disposed in the "repetitive pattern image portion," but represented by a single image datum indicating one image (603) of the same multiple images. In short, the "repetitive pattern image portion" is described by using the "repetitive rendering command" of the unit image 603. Here, the "repetitive rendering command" (command to dispose the unit image repeatedly) is a rendering command which includes a portion D1 in which image data of a single unit image is described and a portion D2 (D22) in which it is described that the predetermined area (area 601 larger than the unit image 603) is filled with the unit image (brush pattern). In the print-out based on the PCL data as described above, the unit image 603 set as the "brush" is automatically used, and a rectangle filled with the unit image 603 is rendered in the predetermined area 601.

In Step S16, the positional information of the predetermined area 601 acquired in Step S13 may be used. At that time, conversion of the unit system may be performed appropriately. In FIG. 7, when output at 600 dpi is performed, "118.08" (1/96 inch) is converted to "738" (dots (pixels))=118.08*600/96) Conversion of other values is performed in the same manner. Consequently, in Step S16, coordinates of the upper left point (738,558) and coordinates of the lower right point. (3597,2378) of the predetermined area 601 are described.

According to the above aspect, only the non-repetitive portion data of the XPS data is converted to the PCL data by using the standard filter, and the repetitive portion data of the XPS data is converted to a "repetitive rendering command" relating to the unit image 603. Consequently, a data amount of the converted PCL data can be suppressed in comparison to a case where the whole XPS data is converted to PCL data by using the standard filter. This is particularly useful when an extremely wide area (an area significantly larger than the unit image (for example, an area which is at least 100 times larger than the unit image)) is filled by using a particular fill pattern.

<3. Variations>

Hereinabove, the embodiments of the present invention have been described. However, the present invention is not limited to the content of the above description.

For example, in each of the above embodiments, Step S15 and Step S16 are executed in this order, but not limited thereto. Step S15 and Step S16 may be executed in reverse order to the above (in other words, in order from Step S16 to Step S15). Alternatively, Steps S15 and S16 may be executed in parallel.

In addition, in each of the above embodiments, XPS data is exemplified as unconverted data described in a first page description language, and PCL data is exemplified as converted data described in a second page description language. However, there is no limitation thereto. The unconverted data may be PCL data, and the converted data may be XPS data. Furthermore, the unconverted data and/or converted data may be data such as PostScript data described in other page description language (such as PostScript). In other words, each page description language is not limited to XPS, PCL, and may be other page description language such as PostScript.

According to an embodiment of the present invention, it is possible to suppress an increase in a data amount in a conversion process from a page description language (PDL) to another PDL.

Although the present invention has been described and illustrated in detail, it is clearly understood that the same is by way of illustrated and example only and is not to be taken by way of limitation, the scope of the present invention being interpreted by terms of the appended claims.

What is claimed is:
1. A non-transitory recording medium storing a computer readable program that is executable by a computer to convert first page description language data described in a first page description language to second page description language data described in a second page description language, wherein the first page description language is convertible to the second page description language using a computer-executable general-purpose conversion process, the program being executable by the computer to cause the computer to perform functions comprising:
  a) analyzing the first page description language data described in the first page description language to determine whether a repetitive pattern image portion is included in the first page description language data;
  b) in a case in which it is determined that the repetitive pattern image portion is included in the first page description language data, separating the repetitive pattern image portion from the first page description language data;
  c) generating first partial data in the second page description language by converting the repetitive pattern image portion separated from the first page description language data to the second page description language using a unit image repetitive rendering command in the second page description language, without performing the general-purpose conversion processing on the repetitive pattern image portion, wherein the unit image repetitive rendering command is a rendering command to render the repetitive pattern image portion of the first page description language data by using a single image datum relating to a unit image which is repeated in the repetitive pattern image portion, wherein the single image datum relating to the unit image is described only once in the first partial data, irrespective of a number of repetitions of the unit image in the repetitive pattern image portion described in the first page description language data;
  d) generating second partial data in the second page description language by converting a portion other than the repetitive pattern image portion of the first page description language data to the second page description language using the general-purpose conversion process for converting the first page description language to the second page description language; and
  e) combining the first partial data and the second partial data to generate converted second page description language data that relates to the first page description language data, and that is described in the second page description language, wherein the general-purpose conversion process performs conversion such that, if the repetitive pattern image portion included in the first page description language data were converted to the second page description language using the general-purpose conversion process, the repetitive pattern image portion would be converted in expanded form in the second page description language, in which the image datum of the unit image is repeatedly described according to the number of repetitions of the unit image in the repetitive pattern image portion described in the first page description language data, whereby conversion of the repetitive pattern image portion using the unit image repetitive rendering command achieves a reduced data amount of the converted second page description language data as compared to a case in which the repetitive pattern image portion is converted using the general-purpose conversion process.

2. The non-transitory recording medium storing a computer readable program according to claim 1, wherein said d) generating the second partial data comprises:

generating the second partial data by using a general-purpose conversion program that performs the general-purpose conversion process to convert the first page description language data to the second page description language data.

3. The non-transitory recording medium storing a computer readable program according to claim 1, wherein:

said b) separating the repetitive pattern image portion from the first page description language data comprises:

b-1) identifying a two-dimensional position of the repetitive pattern image portion in a rendering page, and the first partial data generated in said c) generating includes specification of a rendering position for rendering the repetitive pattern image portion in the two-dimensional position identified in said b-1) identifying.

4. The non-transitory recording medium storing a computer readable program according to claim 1, wherein:

said b) separating the repetitive pattern image portion from the first page description language data comprises:

b-2) identifying a description position of the repetitive pattern image portion in the first page description language data, and said e) combining the first partial data and the second partial data to generate the converted second page description language data comprises:

inserting the first partial data in a position corresponding to the description position identified in said b-2) identifying in the second partial data.

5. The non-transitory recording medium storing a computer readable program according to claim 1, wherein:

said e) combining the first partial data and the second partial data to generate the converted second page description language data comprises:

e-1) describing the first partial data after the second partial data in the second page description language data when it is determined that the repetitive pattern image is to be rendered on a front-surface side of a partial image other than the repetitive pattern image; and e-2) describing the second partial data after the first partial data in the second page description language data when it is determined that the repetitive pattern image is to be rendered on a back-surface side of a partial image other than the repetitive pattern image.

6. The non-transitory recording medium storing a computer readable program according to claim 1, wherein:

the first page description language is extensible markup language (XML) paper specification (XPS), and the second page description language is printer command language (PCL).

7. The non-transitory recording medium storing a computer readable program according to claim 1, wherein:

the repetitive pattern is a background pattern image, and the unit image is a unit image that constitutes the background pattern image.

8. The non-transitory recording medium storing a computer readable program according to claim 1, wherein:

the repetitive pattern is a fill pattern in an application program, and the unit image is a unit image that constitutes the fill pattern.

9. A print control apparatus capable of converting first page description language data described in a first page description language to second page description language data described in a second page description language, wherein the first page description language is convertible to the second page description language using a computer-executable general-purpose conversion process, the print control apparatus comprising:

a determination unit that analyzes the first page description language data described in the first page description language to determine whether a repetitive pattern image portion is included in the first page description language data;

a separation unit that, in a case in which it is determined that the repetitive pattern image portion is included in the first page description language data, separates the repetitive pattern image portion from the first page description language data;

a first generation unit that generates first partial data in the second page description language by converting the repetitive pattern image portion separated from the first page description language data to the second page description language using a unit image repetitive rendering command in the second page description language, without performing the general-purpose conversion processing on the repetitive pattern image portion, wherein the unit image repetitive rendering command is a rendering command to render the repetitive pattern image portion of the first page description language data by using a single image datum relating to a unit image which is repeated in the repetitive pattern image portion, wherein the single image datum relating to the unit image is described only once in the first partial data, irrespective of a number of repetitions of the unit image in the repetitive pattern image portion described in the first page description language data;

a second generation unit that generates second partial data in the second page description language by converting a portion other than the repetitive pattern image portion of the first page description language data to the second page description language using the general-purpose conversion process for converting the first page description language to the second page description language; and a synthesis unit that combines the first partial data and the second partial data to generate converted second page description language data that relates to the first page description language data, and that is described in the second page description language, wherein the general-purpose conversion process performs conversion such that, if the repetitive pattern image portion included in the first page description language data were converted to the second page description language using the general-purpose conversion process, the repetitive pattern image portion would be converted in expanded form in the second page description language, in which the image datum of the unit image is repeatedly described according to the number of repetitions of the unit image in the repetitive pattern image portion described in the first page description language data, whereby conversion of the repetitive pattern image portion using the unit image repetitive rendering command achieves a reduced data amount of the converted second page description language data as compared to a case in which the repetitive pattern image portion is converted using the general-purpose conversion process.

10. The print control apparatus according to claim 9, wherein the second generation unit generates the second partial data by using a general-purpose conversion program that performs the general-purpose conversion process to convert the first page description language data to the second page description language data.

11. The print control apparatus according to claim 9, wherein:
the separation unit identifies a two-dimensional position of the repetitive pattern image portion in a rendering page, and
the first partial data includes specification of a rendering position for rendering the repetitive pattern image portion in the two-dimensional position.

12. The print control apparatus according to claim 9, wherein:
the separation unit identifies a description position of the repetitive pattern image portion in the first page description language data, and
the synthesis unit generates the second page description language data by inserting the first partial data in a position corresponding to the description position identified by the separation unit in the second partial data.

13. The print control apparatus according to claim 9, wherein:
the synthesis unit describes the first partial data after the second partial data in the second page description language data when it is determined that the repetitive pattern image is to be rendered on a front-surface side of a partial image other than the repetitive pattern image, and
the synthesis unit describes the second partial data after the first partial data in the second page description language data when it is determined that the repetitive pattern image is to be rendered on a back-surface side of a partial image other than the repetitive pattern image.

14. The print control apparatus according to claim 9, wherein:
the first page description language is extensible markup language (XML) paper specification (XPS), and
the second page description language is printer command language (PCL).

15. The print control apparatus according to claim 9, wherein:
the repetitive pattern is a background pattern image, and the unit image is a unit image that constitutes the background pattern image.

16. The print control apparatus according to claim 9, wherein:
the repetitive pattern is a fill pattern in an application program, and
the unit image is a unit image that constitutes the fill pattern.

17. A print control system comprising:
a print control apparatus capable of converting first page description language data described in a first page description language to second page description language data described in a second page description language, wherein the first page description language is convertible to the second page description language using a computer-executable general-purpose conversion process; and
a printing apparatus that performs print-out based on a print command from the print control apparatus,
wherein the print control apparatus comprises:
a determination unit that analyzes the first page description language data described in the first page description language to determine whether a repetitive pattern image portion is included in the first page description language data;
a separation unit that, in a case in which it is determined that the repetitive pattern image portion is included in the first page description language data, separates the repetitive pattern image portion from the first page description language data;
a first generation unit that generates first partial data in the second page description language by converting the repetitive pattern image portion separated from the first page description language data to the second page description language using a unit image repetitive rendering command in the second page description language, without performing the general-purpose conversion processing on the repetitive pattern image portion, wherein the unit image repetitive rendering command is a rendering command to render the repetitive pattern image portion of the first page description language data by using a single image datum relating to a unit image which is repeated in the repetitive pattern image portion, wherein the single image datum relating to the unit image is described only once in the first partial data, irrespective of a number of repetitions of the unit image in the repetitive pattern image portion described in the first page description language data;
a second generation unit that generates second partial data in the second page description language by converting a portion other than the repetitive pattern image portion of the first page description language data to the second page description language using the general-purpose conversion process for converting the first page description language to the second page description language; and
a synthesis unit that combines the first partial data and the second partial data to generate converted second page description language data that relates to the first page description language data, and that is described in the second page description language,
wherein the general-purpose conversion process performs conversion such that, if the repetitive pattern image portion included in the first page description language data were converted to the second page description language using the general-purpose conversion process, the repetitive pattern image portion would be converted in expanded form in the second page description language, in which the image datum of the unit image is repeatedly described according to the number of repetitions of the unit image in the repetitive pattern image portion described in the first page description language data, whereby conversion of the repetitive pattern image portion using the unit image repetitive rendering command achieves a reduced data amount of the converted second page description language data as compared to a case in which the repetitive pattern image portion is converted using the general-purpose conversion process.

* * * * *